United States Patent
Ohara

(10) Patent No.: US 8,072,515 B2
(45) Date of Patent: Dec. 6, 2011

(54) CORRECTION CIRCUIT, CORRECTION METHOD AND IMAGE PICKUP APPARATUS

(75) Inventor: Kunihiro Ohara, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 511 days.

(21) Appl. No.: 12/169,180

(22) Filed: Jul. 8, 2008

(65) Prior Publication Data

US 2009/0046178 A1 Feb. 19, 2009

(30) Foreign Application Priority Data

Aug. 16, 2007 (JP) .................. 2007-212403

(51) Int. Cl.
*H04N 9/64* (2006.01)
*G06K 9/40* (2006.01)

(52) U.S. Cl. ...................... 348/251; 382/274

(58) Field of Classification Search ............ 348/251, 348/252, 246, 224.1; 382/274, 275, 260, 382/255, 252
See application file for complete search history.

(56) References Cited

U.S. PATENT DOCUMENTS

| | | | |
|---|---|---|---|
| 6,937,777 B2 | 8/2005 | Shirakawa | |
| 7,317,482 B2 * | 1/2008 | Sato et al. | 348/251 |
| 7,570,837 B2 * | 8/2009 | Hori | 382/274 |
| 7,656,443 B2 * | 2/2010 | Ikeda | 348/246 |
| 2002/0008760 A1 * | 1/2002 | Nakamura | 348/222 |
| 2003/0156190 A1 * | 8/2003 | Sato et al. | 348/94 |
| 2004/0174445 A1 * | 9/2004 | Kawakami et al. | 348/251 |
| 2005/0219404 A1 * | 10/2005 | Kobayashi | 348/362 |
| 2005/0275904 A1 | 12/2005 | Kido et al. | |
| 2006/0274170 A1 * | 12/2006 | Azuma | 348/246 |
| 2008/0273812 A1 * | 11/2008 | Fujita et al. | 382/274 |

FOREIGN PATENT DOCUMENTS

| | | | |
|---|---|---|---|
| JP | 2002-010122 A | 1/2002 | |
| JP | 2002-218298 A | 8/2002 | |
| JP | 2005-341033 A | 12/2005 | |

* cited by examiner

*Primary Examiner* — Trung Diep
(74) *Attorney, Agent, or Firm* — Arent Fox LLP

(57) ABSTRACT

Aspects of an embodiment include providing a correction circuit that corrects image data in apiece of a frame, the correction circuit comprising: a weight processing unit which performs weighting on position data corresponding to a relative position in response to the relative position between a position of a pixel in the image data and a certain position in the frame; and a correction processing unit that corrects the image data based on a correction value corresponding to the weighted position data.

20 Claims, 13 Drawing Sheets

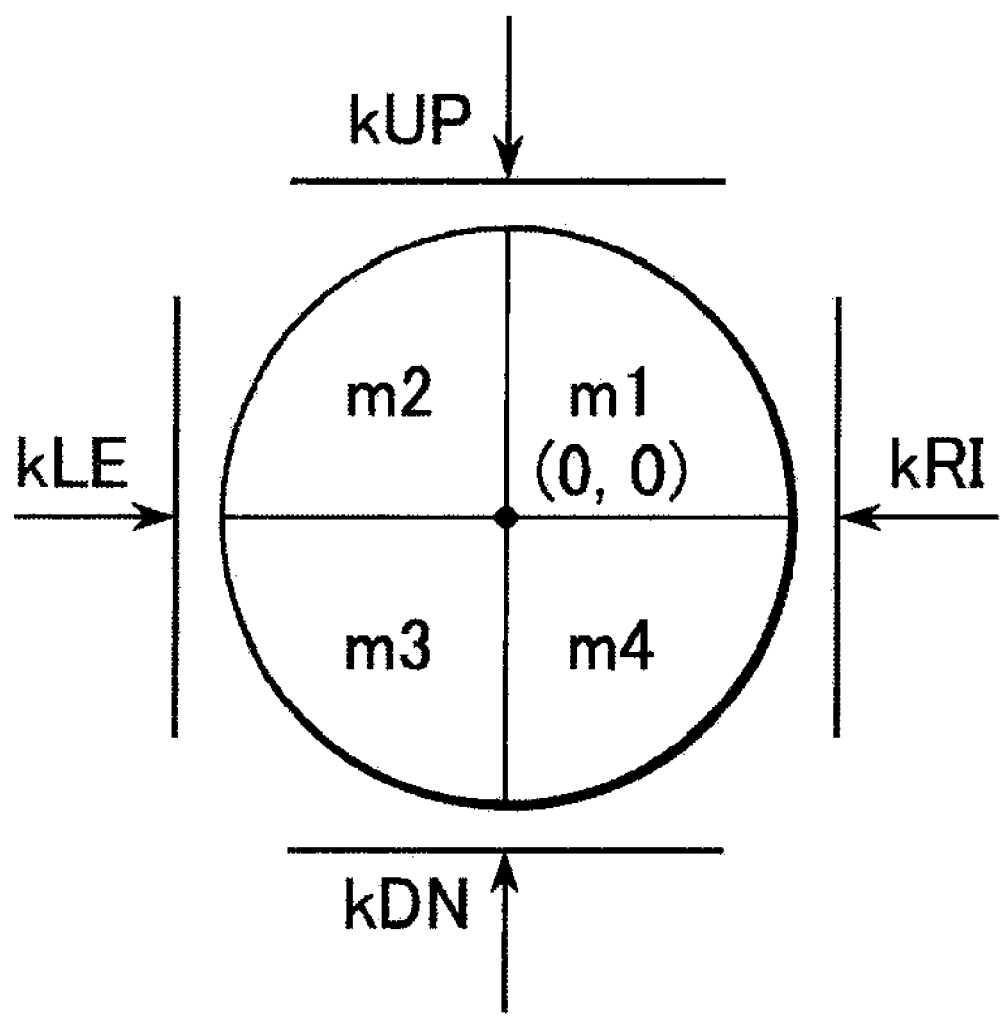

kRI=+1.0
kUP=+1.0
kLE=+1.0
kDN=+1.0 kRI=+2.0
kUP=+1.0
kLE=+2.0
kDN=+1.0 kRI=+1.0
kUP=+2.0
kLE=+1.0
kDN=+2.0 kRI=+2.0
kUP=+2.0
kLE=+1.0
kDN=+1.0 kRI=+0.8
kUP=+0.8
kLE=+0.8
kDN=+0.8

CORRECTION CIRCUIT, CORRECTION METHOD AND IMAGE PICKUP APPARATUS

CROSS-REFERENCE TO RELATED APPLICATIONS

This application claims the benefit of priority from Japanese Patent Application No. 2007-212403 filed on Aug. 16, 2007, the entire contents of which are incorporated herein by reference.

BACKGROUND OF THE INVENTION

1. Field of the Invention

Aspects of the present application relate to a shading correction circuit which is used for correcting unevenness in luminance occurring in an image pickup element of a digital still camera or the like.

2. Description of Related Art

Generally, limb darkening occurs in a periphery of an image pickup frame in an image processing apparatus using an image pickup element including a CCD sensor, a COME sensor or the like. To correct such limb darkening, the image processing apparatus is equipped with a shading correction circuit. It is necessary not only to improve accuracy in correction of the shading correction circuit, but also to reduce the shading correction circuit size. For example, Japanese Patent Laid-Open Publication No. 2002-10122, Japanese Patent Laid-Open Publication No. 2002-218298, Japanese Patent Laid-Open Publication No. 2005-341033 and so on disclose the shading correction technique.

Japanese Patent Laid-Open Publication No. 2002-10122 discloses a shading correction system. In this system, an image of a uniform light source is taken to produce reference shading correction data and this reference shading correction data is stored in a memory. Next, when the shading correction is performed on a read out image, the reference shading correction data undergoes an appropriate correction according to image pickup magnification to perform the shading correction. However, it is difficult to achieve sufficient reduction in the memory capacity used for storing the reference shading correction data, in the above-described shading correction system.

Japanese Patent Laid-Open Publication No. 2002-218298 discloses an image pickup apparatus. In this apparatus, a shading correction coefficient corresponding to luminance data taken from respective pixels of the image pickup element is extracted from the shading correction coefficients stored in a memory. However, the above-described image pickup element requires a large capacity memory in order to store the shading correction coefficients corresponding to the respective pixels, in the memory.

Japanese Patent Laid-Open Publication No. 2005-341033 discloses another image pickup apparatus. In this apparatus, the shading correction is performed on a picked-up image with the use of a dedicated correction table with respect to each color component. This apparatus is, also, equipped with a shading correction table for a lens system and a shading correction table for a sensor system. However, this image pickup element also requires a large capacity memory in order to store the shading correction tables.

SUMMARY

Aspects in accordance with the present invention include providing a correction circuit which corrects an image data in a piece of a frame, the correction circuit comprising: a weight processing unit which performs weighting on position data corresponding to a relative position in response to the relative position between a position of a pixel in the image data and a certain position in the frame; and a correction processing unit which corrects the image data based on a correction value corresponding to the weighted position data.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIG. 9 shows processing performed by the weight processing unit according to the exemplary implementation in accordance with aspects of the present invention;

DESCRIPTION OF PREFERRED EMBODIMENTS

Figure 1:
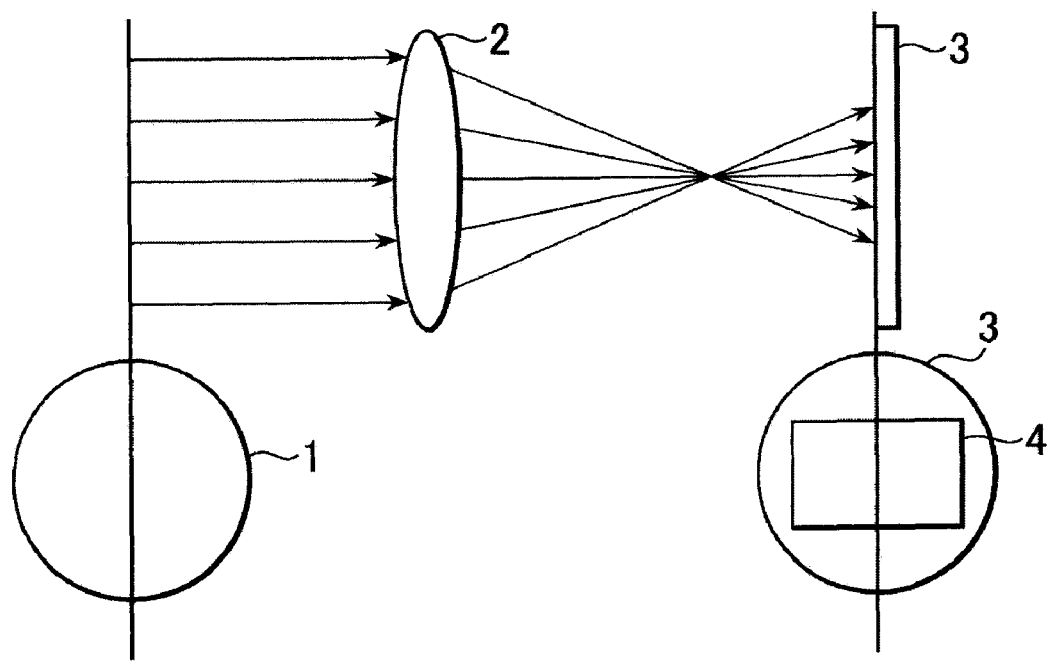
FIG. 1 shows an image pickup operation of a CCD sensor.

FIG. 1 shows an image pick up operation of a digital camera. Light emitted from a light source 1 (i.e., a photographic subject) is picked up through a lens 2 in an image pickup area 4, which has a rectangular shape for example, on a image pickup element 3, as one-frame image data.

As, at this stage of the image pickup operation, an incident angle of the light that is incident on the image pickup element 3 through the lens 2 becomes greater as the light is brought closer to a periphery of the image pickup area 4, luminance (brightness) in the periphery of the image pickup area 4 reduces more than the luminance in a central portion of the image pickup area 4. As a result, unevenness in luminance, which is more reduced in the periphery of the image pickup area 4, occurs in the image data picked up in the image pickup area 4.

An image processing apparatus that digitizes one-frame image data taken by an image pickup element to store the image data in record media is equipped with a shading correction circuit used for correcting such luminance unevenness. In addition, in a digital video camera, the image data having multiple frames undergoes shading correction and then the shading-corrected image data is stored in the record media.

Figure 2:
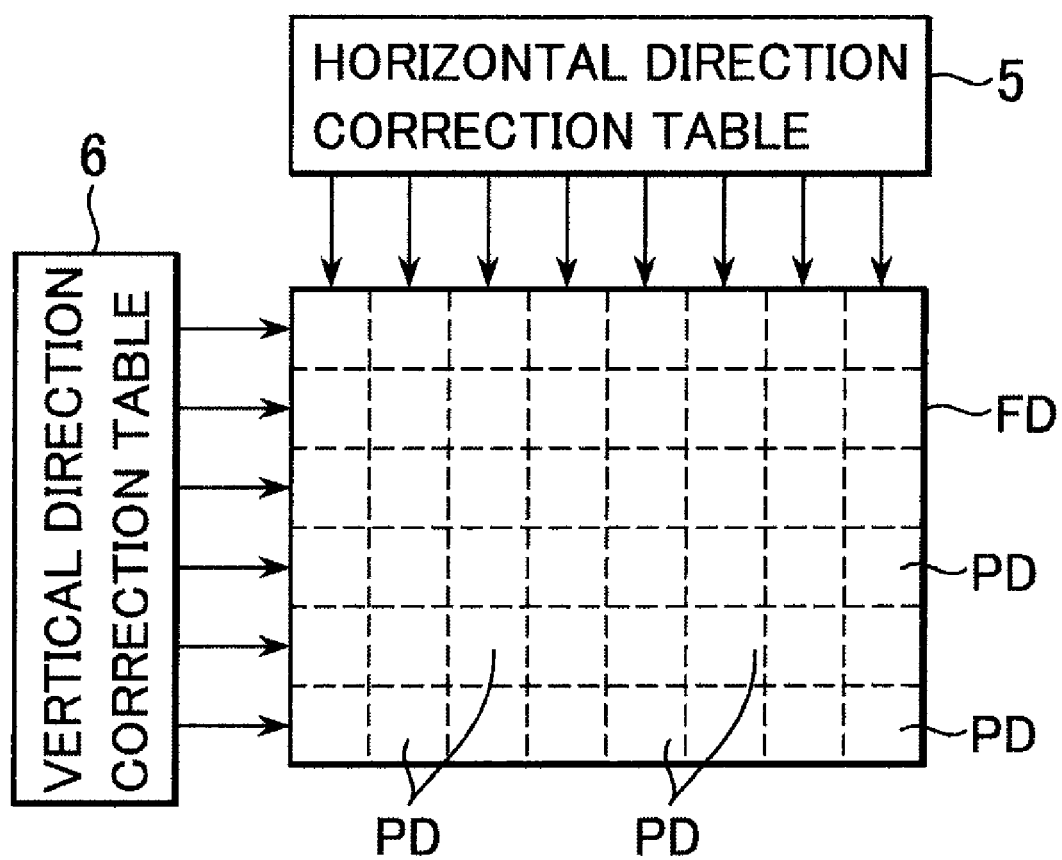
FIG. 2 shows an example of an operation of a shading correction circuit.

FIGS. 2 and 3 show the operation of an exemplary shading correction circuit. Image data FD taken by the image pickup element 3 comprises pixel data PD from multiple pixels arranged in a horizontal direction and a vertical direction. Pixel data PD closer to the periphery of the frame has a lower luminance.

For the above reason, the shading correction circuit is equipped with at least one of a horizontal direction correction table 5 and a vertical direction correction table 6. The horizontal direction correction table 5 stores correction coefficients used for correcting the luminance of the pixel data PD with respect to each row in the horizontal direction. The vertical direction correction table 6 stores correction coefficients used for correcting the luminance of the pixel data PD with respect to each column in the vertical direction.

Figure 3A:
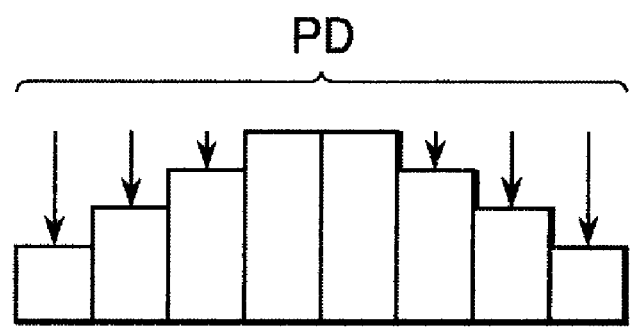
FIG. 3 shows the example of operation of the shading correction circuit.

FIGS. 3A though 3C show a case where one-dimensional correction is performed on the pixel data PD with respect to each row in the horizontal direction by using the correction coefficients stored in the horizontal direction correction table 5.

As shown in FIG. 3A, of the pixel data PD the closer to the periphery in each row in the horizontal direction has a lower luminance. The horizontal direction correction table 5 stores, in advance, a correction coefficient Adh corresponding to a corresponding row. The correction coefficient Adh is a coefficient used for correcting decreased luminance of each of the pixel data PD.

Figure 3B:
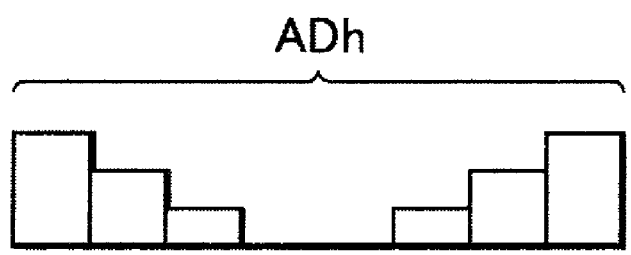
Figure 3C:
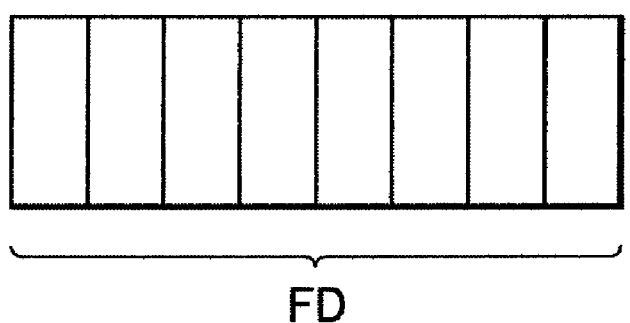

Adding the correction coefficient Adh shown in FIG. 3B to the pixel data PD allows generation of the corrected image data FD shown in FIG. 3C. The image data FD is data in which correction of luminance unevenness at the periphery of the frame is completed.

In some cases, adding the correction coefficients stored in the vertical direction correction table 6 to the pixel data PD of each column in the vertical direction allows generation of the corrected image data FD. In addition, in some cases, use of the correction coefficients stored in the horizontal direction correction table 5 and the vertical direction correction table 6 allows two-dimensional correction.

The above-described shading correction circuit requires at least one of the horizontal direction correction table 5 or the vertical direction correction table 6 in order to correct limb darkening of the pixel data PD. In consequence, it is necessary that the correction coefficients corresponding to all of the pixel data PD forming the piece of frame be stored in each of the correction tables 5 and 6.

As, for the above reason, a large capacity memory is necessary in order to include at least one of the correction tables 5 and 6, an image processing IC including the shading correction circuit problematically becomes larger in scale. Moreover, the luminance unevenness of the one-frame pixel data PD occurs in a concentric manner from a center C of the frame to the periphery thereof. Furthermore, it is difficult to precisely correct the luminance unevenness in a concentric fashion by one-dimensional or two-dimensional correction using each of the correction tables 5 and 6.

Figure 4:
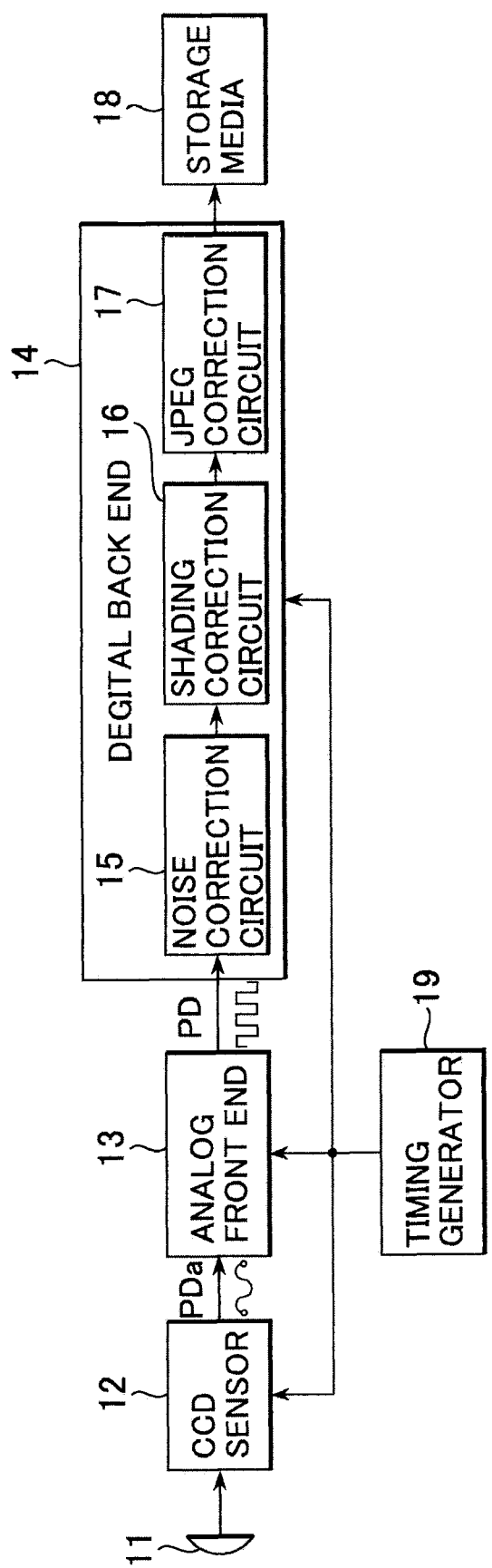
FIG. 4 shows an exemplary implementation in accordance with the present invention.

FIG. 4 shows a digital still camera according to an exemplary implementation in accordance with aspects of the present invention. The digital still camera according to this implementation in accordance with aspects of the present invention includes a shading correction circuit. Pixel data PDa taken by a CCD sensor 12 through a lens 11 is supplied, as an analog signal, to an analog front end 13. The analog front end 13 outputs the digitized pixel data PD to a digital back end 14.

The digital back end 14 includes a noise correction circuit 15, a shading correction circuit 16 and a compression circuit 17. The noise correction circuit 15 performs noise correction on the pixel data PD. The shading correction circuit 16 performs shading correction on the noise-corrected pixel data PD. The compression circuit 17 compresses the shading-corrected pixel data PD into JPEG data.

The JPEG data generated in the compression circuit 17 is output to storage media 18 and the storage media 18 stores the JPEG data. A timing generator 19 generates a pixel clock PCLK, a vertical synchronization signal VD and a horizontal synchronization signal HD and outputs the above signals to the CCD sensor 12, the analog front end 13 and the digital back end 14.

FIG. 5 shows a read operation of the pixel data PD read from the CCD sensor 12 via the analog front end 13. The pixel clock PCLK, the vertical synchronization signal VD and the horizontal synchronization signal HD are input to the CCD sensor 12.

When the vertical synchronization signal VD rises to an H level from an L level while the pixel clock PCLK is being input, the read operation of the pixel data PDa of one frame picked up by the CCD sensor 12 is started. In this state, the pixel data PDa is sequentially read out with respect to each row, each time the horizontal synchronization signal HD rises to an H level from an L level.

Figure 5A:
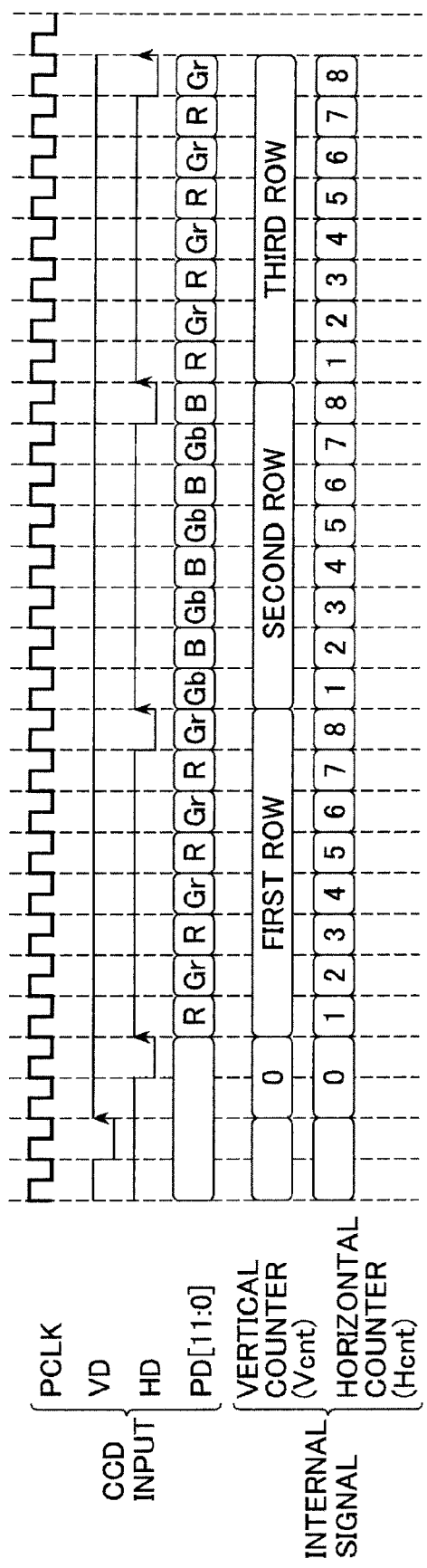
FIGS. 5A and 5B show a pixel data read out operation according to the exemplary implementation in accordance with aspects of the present invention.
Figure 5B:
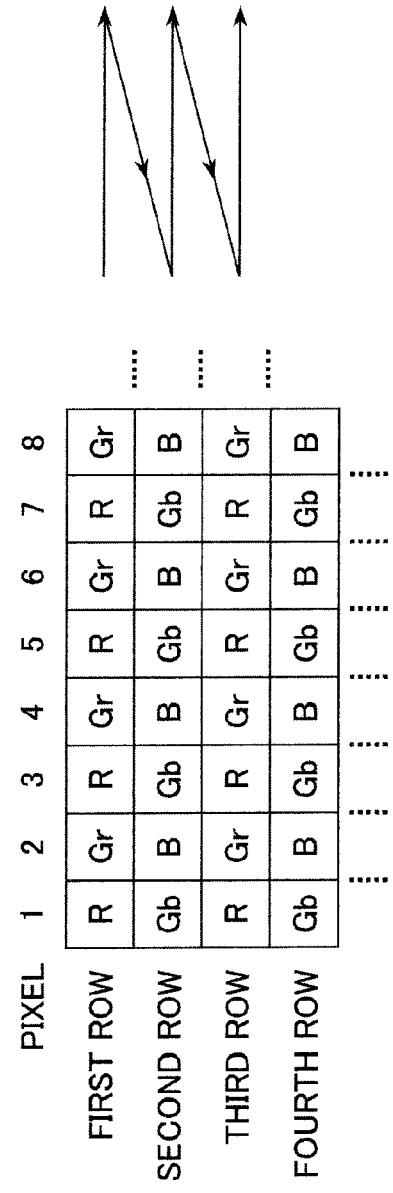

In FIGS. 5A and 5B, the number of pixels in a single row is eight (8) for descriptive purposes. First, the vertical synchronization signal VD rises to the H level from the L level and then the horizontal synchronization signal HD rises to the H level from the L level, so that the pixel data PDa is sequentially read out pixel by pixel. Each time the pixel data PDa of eight (8) pixels is read out, the horizontal synchronization signal HD rises to the H level from the L level and the pixel data PDa in the next row is read out.

As shown in FIG. 5B, first, the pixel data PDa of a first row is read out from a first pixel (i.e., a leftmost pixel) to an eighth pixel (i.e., a rightmost pixel) in sequence, as indicated by an arrowed line. Next, the pixel data PDa of a second row is read out, in sequence, from a first pixel (i.e., a leftmost pixel) to an eighth pixel (i.e., a rightmost pixel). Finally, the one-frame pixel data is read out, in sequence, from the first row to a last row.

The shading correction circuit 16 in the digital back end 14 includes a vertical counter Vcnt and a horizontal counter Hcnt. The vertical counter Vcnt and the horizontal counter Hcnt count the pixel clock PCLK in response to rising of the horizontal synchronization signal HD While the pixel data PDa is being read out.

The vertical counter Vcnt generates a row number of the pixel data PD that is input, by counting up each time the vertical counter Vcnt starts counting in response to the rising of the horizontal synchronization signal HD and counts to eight pulses of the pixel clock PCLK. The horizontal counter Hcnt starts counting up the pixel clock PCLK in response to the rising of the horizontal synchronization signal HD, and resets the counted value and outputs a pixel number each time the horizontal counter Hcnt counts to eight pulses of the pixel clock PCLK.

Figure 6:
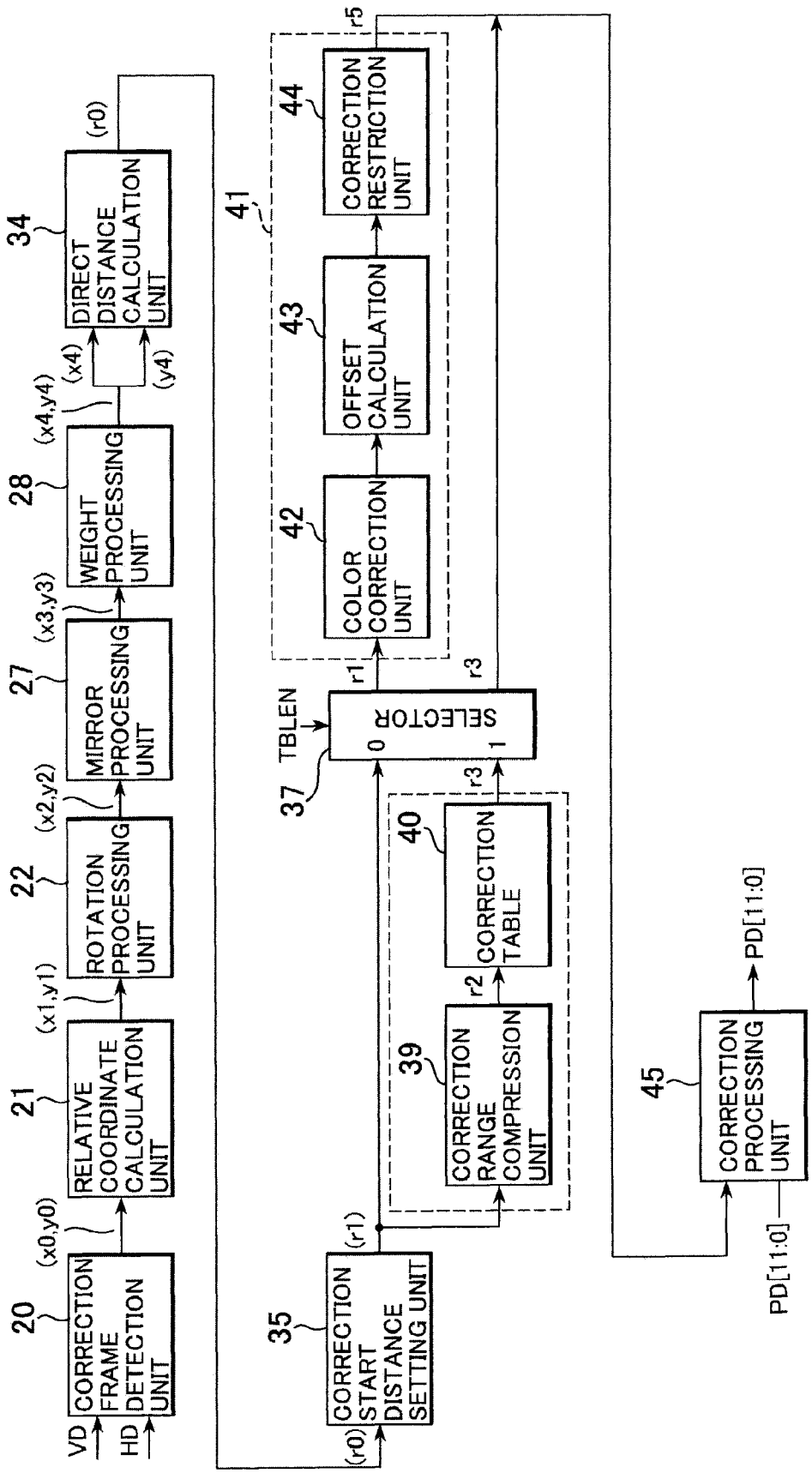
FIG. 6 shows a shading correction circuit according to the exemplary implementation in accordance with aspects of the present invention.

FIG. 6 shows the shading correction circuit 16 according to an exemplary implementation in accordance with aspects of the present invention. A correction frame detection unit 20 includes the vertical counter Vcnt and the horizontal counter Hcnt. The correction frame detection unit 20 generates coordinates data (x0, y0) of each pixel data PD as position data based on the counted values of each counter, which corresponds the input one-frame pixel data PD. The origin coordinates (0,0) of the coordinates data (x0, y0) is coordinates of the first pixel in the first row.

That is to say, when the vertical synchronization signal VD and the horizontal synchronization signal HD are input to the shading correction circuit 16, with the pixel data PD, the correction frame detection unit 20 counts the vertical synchronization signal VD and the horizontal synchronization signal HD and then generates the coordinates data (x0, y0) of the pixel data PD.

The coordinate data (x0,y0) generated in the correction frame detection unit 20 is input to a relative coordinates calculation unit 21. The center coordinates (xc,yc) of the pixel data PD of one frame, which is output from the correction frame detection unit 20, is input to the relative coordinates calculation unit 21. The relative coordinates calculation unit 21 uses the center coordinates (xc,yc) as the origin (0,0) to convert the supplied coordinates data (x0,y0) into relative coordinates (x1,y1) and outputs the relative coordinates (x1, y1).

Note that conversion into the relative coordinates (x1,y1) according to this implementation in accordance with aspects of the present invention is not limited to cases where the center coordinates (xc,yc) are used, and it is capable of using any coordinates in the frame. The relative coordinates (x1,y1) generated in the relative coordinates calculation unit 21 are input to a rotation processing unit 22. The rotation processing unit 22 rotates the relative coordinates (x1,y1) in units of forty five (45) degrees relative to the origin thereof, as necessary.

Figure 7A:
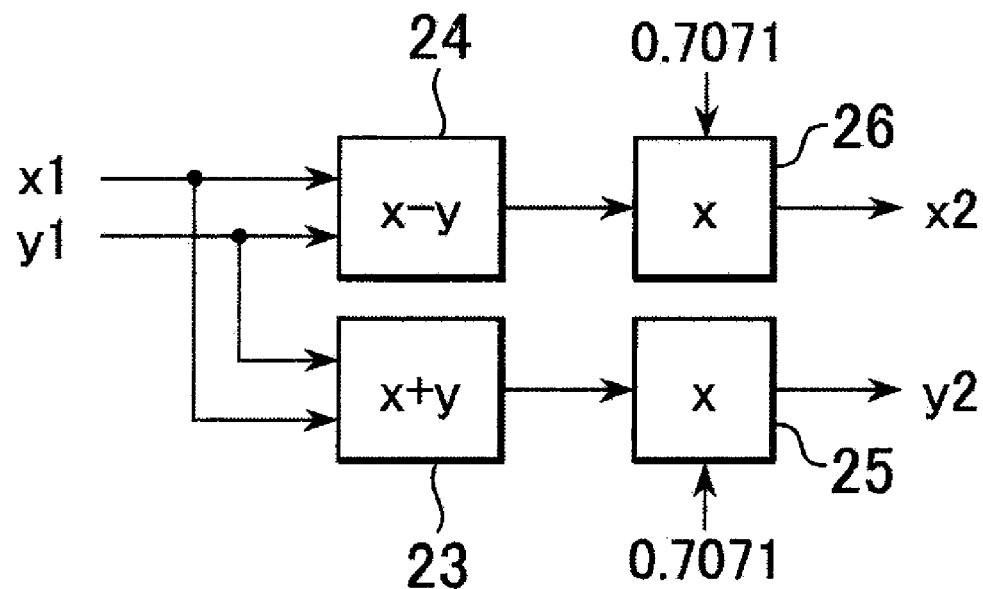
FIGS. 7A and 7B show a rotation processing unit according to the exemplary embodiment in accordance with aspects of the present invention.
Figure 7B:
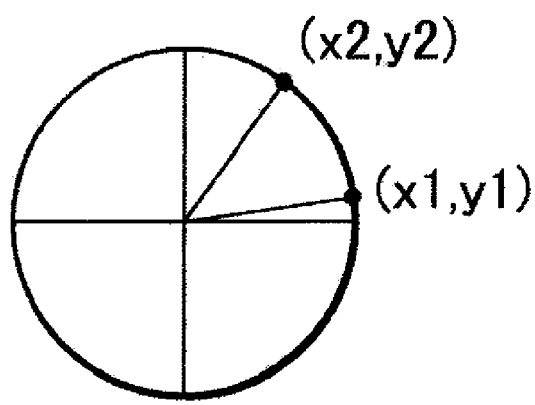

FIG. 7 shows the rotation processing unit 22 according to an exemplary implementation in accordance with aspects of the present invention. As sown in FIG. 7A, the relative coordinates (x1,y1) are input to an adder 23 and a subtractor 24, respectively. The adder 23 performs addition of coordinates values of the relative coordinates (x1,y1) and outputs the result of the addition to a multiplier 25. The subtractor 24 performs subtraction of the coordinates values of the relative coordinates (x1,y1) and outputs the result of the subtraction to a multiplier 26.

The multipliers 25 and 26 multiply each of the results of the addition and the subtraction by $\sqrt{2}$ (i.e., 0.7071) respectively and outputs coordinates (x2,y2). As a result, as shown in FIG. 4B, the coordinates (x2, y2) are generated by rotating the relative coordinates (x1,y1) by forty five (45) degrees around the origin.

The coordinates (x2,y2) output from the rotation processing unit 22 in FIG. 6 are input to a mirror processing unit 27 in FIG. 6. The input coordinates (x2,y2) are inverted around the X-axis or around the Y-axis, as necessary, by the mirror processing unit 27 and the results thereof are output as coordinates (x3,y3).

The coordinates (x3,y3) output from the mirror processing unit 27 in FIG. 6 are input to a weight processing unit 28 in FIG. 6. The weight processing unit 28 sets a weight of a shading correction value for the pixel data PD positioned at the coordinates (x3,y3) which are input. The above weight setting is not used in cases where the same shading correction is performed on the pixel data PD positioned on a concentric circle but this weight setting allows the shading correction according to the set weight. Weighting is possible by changing the coordinates relative to the origin (0,0). The weight processing unit 28 outputs new coordinates (x4,y4) to which the weight is added.

Figure 8:
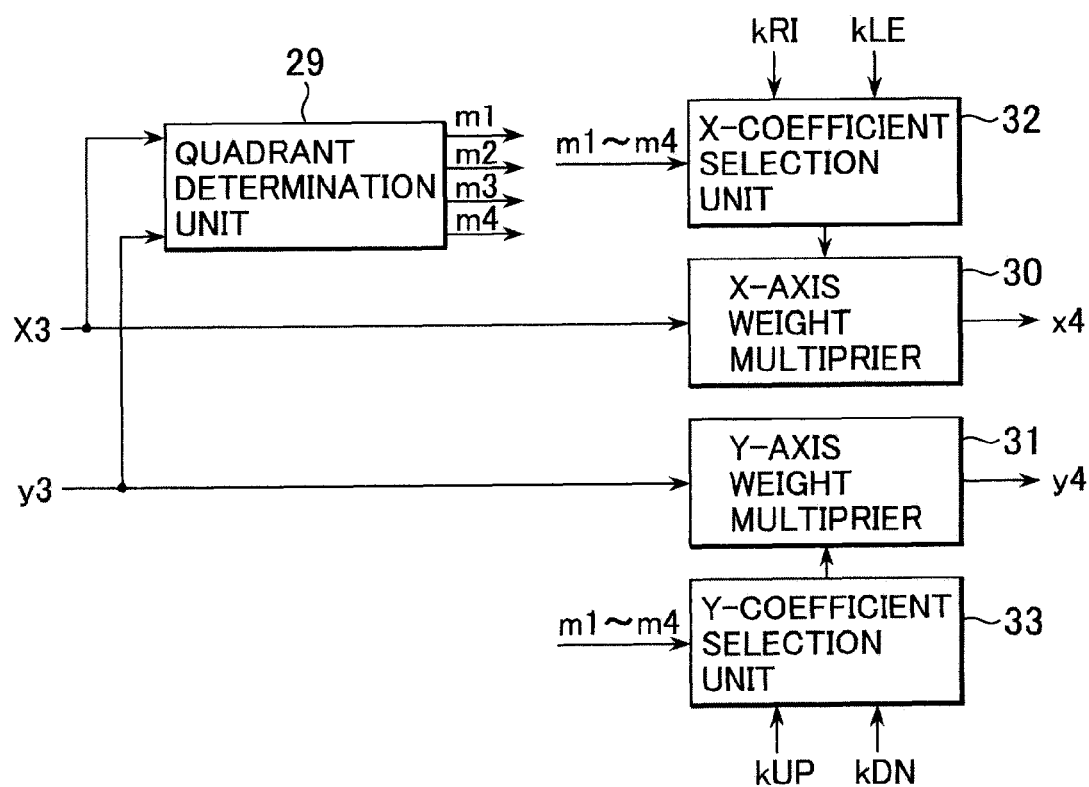
FIG. 8 shows a weight processing unit according to the exemplary implementation in accordance with aspects of the present invention.

FIG. 8 shows the weight processing unit 28 according to the first implementation in accordance with aspects of the present invention. The coordinates (x3,y3) are input to a quadrant determination unit 29. The coordinate (x3) is input to an X-axis weight multiplier 30 and the coordinate (y3) is input to a Y-axis weight multiplier 31.

The quadrant determination unit 29 determines to which quadrant (i.e., first, second, third and fourth quadrants) shown in FIG. 9 certain coordinates belong based on the coordinates (x3,y3), and outputs determination signals m1 through m4 to an X coefficient selection unit 32 and a Y coefficient selection unit 32.

A Right-hand side weighting coefficient kRI and a left-hand side weighting coefficient kLE are input to the X coefficient selection unit 32 It is possible to set any right-hand side weighting coefficients kRI and any left-hand side weighting coefficients kLE in advance before shipping the digital still camera. In some cases, the right-hand side weighting coefficient kRI and the left-hand side weighting coefficient kLE are set by a user of the digital still camera.

An upper base weighting coefficient kUP and a lower base weighting coefficient kDN are input to the Y coefficient selection unit 33. It is possible to set any upper base weighting coefficients kUP and lower base weighting coefficients kDN before shipping the digital still camera or when the digital still camera is used.

The X coefficient selection unit 32 sets the right-hand coefficient kRI and the left-hand coefficient kLE for each of the determination signals m1 through m4 respectively and outputs them to the X-axis weight multiplier 30. The Y-axis selection unit 33 sets the upper base coefficient kUP and the lower base coefficient kDN for each of the determination signals m1 through m4 respectively and outputs them to the Y-axis weight multiplier 31.

The X-axis weight multiplier 30 multiplies the input coordinates (x3) by the coefficient which is supplied from the X coefficient selection unit 32 and the X-axis weight multiplier 30 outputs the multiplied result as the coordinate (x4). On the other hand, the Y-axis weight multiplier 31 multiplies the input coordinates (y3) by the coefficient which is supplied from the Y coefficient selection unit 33 and the Y-axis weight multiplier 31 outputs the multiplied result as the coordinate (y4).

Figure 10A:
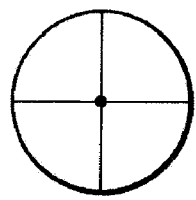
FIGS. 10A through 10E show examples of the weighting which is set in an X-coefficient selection unit and a Y-coefficient selection unit according to the exemplary implementation in accordance with aspects of the present invention.

FIGS. 10A through 10E show examples of the weighting that is set by the X coefficient selection unit 32 and the Y coefficient selection unit 33 in FIG. 8. FIG. 10A shows a first example where values of the right-hand side weighting coefficient kRI, the left-hand side weighting coefficient kLE, the upper base weighting coefficient kUP and the lower base weighting coefficient kDN are all set to one (1). In the first example, the weight for the pixel data in each quadrant is not set.

Figure 10B:
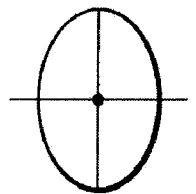

FIG. 10B shows a second example where the values of the right-hand side weighting coefficient kRI and the left-hand side weighting coefficient kLE are set to two (2) and the values of the upper base weighting coefficient kUP and the lower base weighting coefficient kDN are set to one (1). In the second example, the weight in the X-axis direction is symmetrically increased relative to the origin.

Figure 10C:
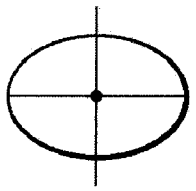

FIG. 10C shows a third example where the values of the right-hand side weighting coefficient kRI and the left-hand side weighting coefficient kLE are set to one (1) and the values of the upper base weighting coefficient kUP and the lower base weighting coefficient kDN are set to two (2). In the third example, the weigh in the Y-axis direction is symmetrically increased relative to the origin.

Figure 10D:
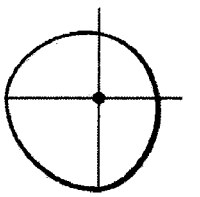

FIG. 10D shows a fourth example where the values of the right-hand side weighting coefficient kRI and the upper base weighting coefficient kUP are set to two (2) and the values of the left-hand side weighting coefficient kLE and the lower base weighting coefficient kDN are set to one (1). In the fourth example, the weight is added to the pixel data in the first quadrant, the weight in the Y-axis direction is added to the pixel data in the second quadrant and the weight in the X-axis direction is added to the pixel data in the fourth quadrant.

Figure 10E:
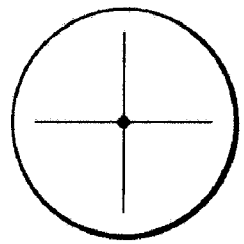

FIG. 10E shows a fifth example where values of the right-hand side weighting coefficient kRI, the left-hand side weighting coefficient kLE, the upper base weighting coefficient kUP and the lower base weighting coefficient kDN are all set to zero point eight (0.8). In the fifth example, the weight is uniformly reduced for the pixel data in the respective quadrants.

The coordinates (x4,y4) supplied from the weight processing unit 28 in FIG. 6 are input to a direct distance calculation unit 34 in FIG. 6. The direct distance calculation unit 34 calculates a direct distance between the input coordinates (x4,y4) and the origin (0,0), and outputs the direct distance as r0. The direct distance r0 is obtained by the theorem of three squares in the following equation: $(r0)^2=(x4)^2+(y4)^2$.

The direct distance r0 supplied from the direct distance calculation unit 34 in FIG. 6 is input to a beginning correction distance setting unit 35. The beginning correction distance setting unit 35 sets the direct distance from the center where the shading correction on the one-frame pixel data starts.

Generally, the luminance unevenness does not occur in the pixel data around the origin (0,0) of the one-frame pixel data. Therefore, when the shading correction is not performed on the pixel data around the origin but the shading correction is performed on certain pixel data at a distance from the origin equal to or more than a certain distance, the beginning correction distance setting unit 35 calculates a direct distance r1 that is obtained by subtracting the direct distance for starting the shading correction from the direct distance r0 and outputs the direct distance r1.

Figure 11:
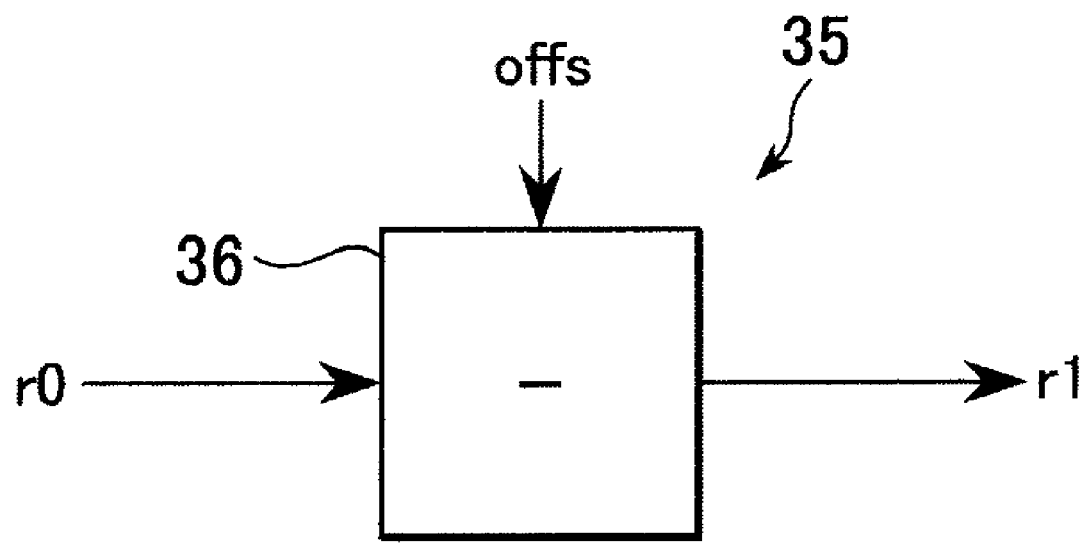
FIG. 11 shows a correction start distance setting unit according to the exemplary implementation in accordance with aspects of the present invention.

FIG. 11 shows beginning correction distance setting unit 35 according to an exemplary implementation in accordance with aspects of the present invention. The supplied direct distance r0 is input to the subtractor 36. A direct distance offset value (offs) is also input to the subtractor 36. It is possible to optionally set the direct distance offset value offs before the shipment of the digital still camera or when the digital still camera is used. The subtractor 36 performs subtraction by subtracting the direct distance offset value offs from the input direct distance r0 and outputs the result of the subtraction, as distance data r1.

Figure 12:
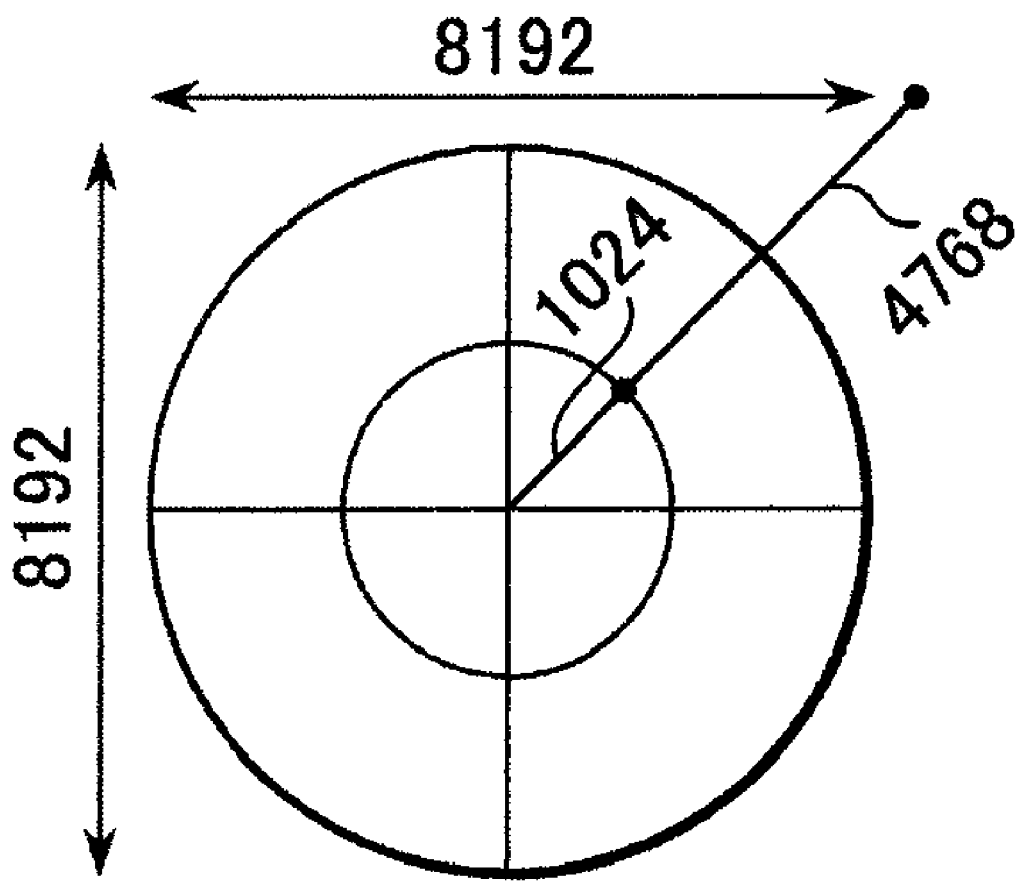
FIG. 12 shows correction start distance setting processing according to the exemplary implementation in accordance with aspects of the present invention.

As shown in FIG. 12, in the correction start distance setting unit 35, when the direct distance offset value offs is set at such a distance that is equal to a distance corresponding to the one thousand and twenty fourth (1024th) pixel from the origin, the shading correction is not performed on the certain pixel data having the direct distance r0 of which from the origin is equal to or less than the distance corresponding to the one thousand and twenty fourth (1024th) pixel.

Figure 13:
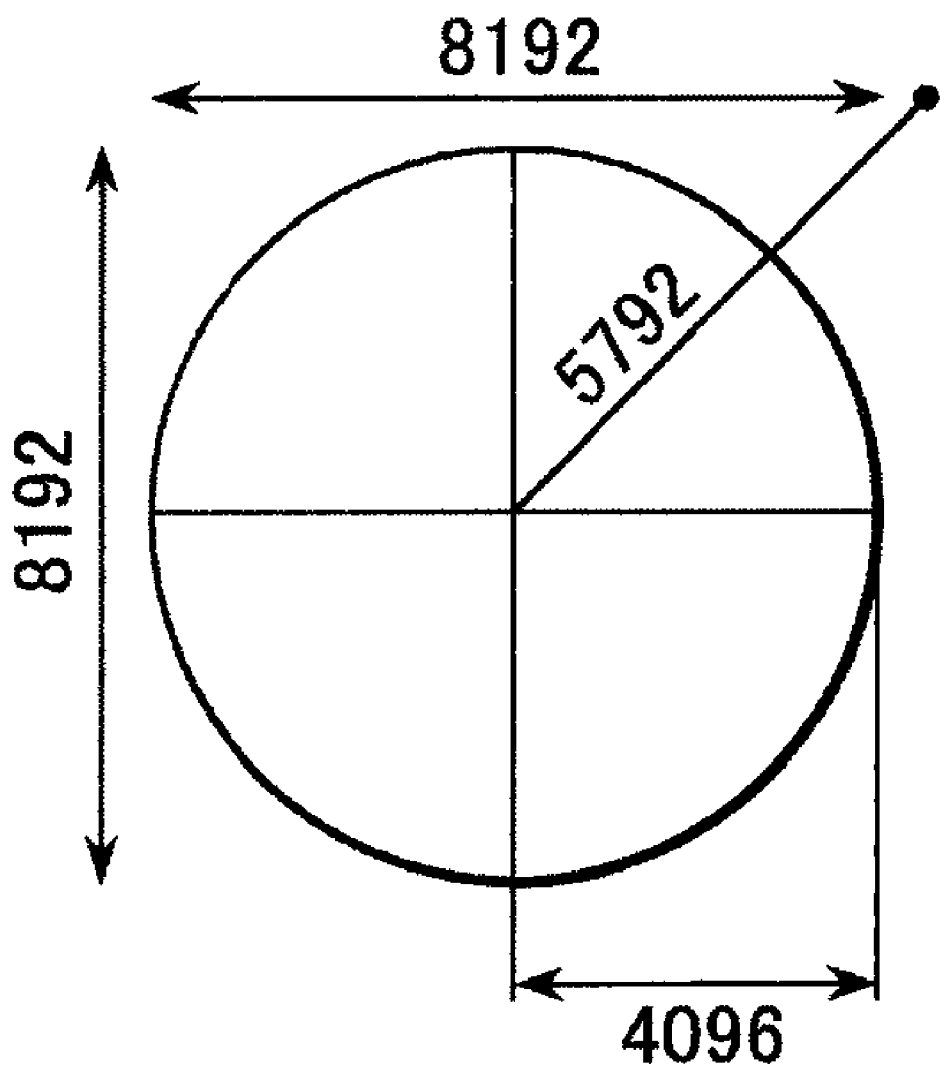
FIG. 13 shows the correction start distance setting processing according to the exemplary implementation in accordance with aspects of the present invention.

As shown in FIG. 13, for example, when maximum distances in the X-axis direction and Y-axis direction in the piece of frame are equal to eight thousand one hundred and ninety two (8192) pixels, a distance between a pixel which is most distant from the origin and the origin is equal to a distance corresponding to five thousand seven hundred and ninety two (5792) pixels, according to the theorem of three squares.

In the above example, setting the direct distance offset value (offs) allows the shading correction to not be performed on the certain pixel data having the direct distance r0 of which from the origin is equal to and less than the distance corresponding to the one thousand and twenty fourth (1024th) pixel.

The distance data r1 supplied from the beginning correction distance setting unit 35 in FIG. 6 is output to a selector 37 in FIG. 6 and a first correction value generation unit 38 in FIG. 6, respectively. The first correction value generation unit 38 generates a correction value based on a correction table that is set in advance, in response to the direct distance r1. The first correction value generation unit 38 includes a correction range compression unit 39 and correction table 40.

As shown in FIG. 12, when the shading correction is performed on certain pixels having the direct distance r0, which ranges from one thousand and twenty four (1024) pixels to five thousand seven hundred and ninety two (5792) pixels, based on a setting of the direct distance offset value (offs), the correction table, which can store four thousand seven hundred and sixty eight (4768) correction values corresponding to each of the distances, is required.

For example, the correction range compression unit 39 in FIG. 6 sets a compression ratio as zero point five (0.5) and outputs a distance data r2 obtained by compressing the distance r1 to half of its original distance. The correction table 40 in FIG. 6 stores two thousand three hundred and eighty four (2384) correction values obtained by compressing four thousand seven hundred and sixty eight (4768) correction values to half of its original number of correction values. When the distance data r2 is input to the correction table 40, the correction table 40 outputs a correction value r3, corresponding to the distance data r2, to the selector 37 in FIG. 6.

The selector 37 in FIG. 6 selects one of the distance data r1 and correction value r3 based on an enable signal TBLEN that is input, and the selector 37 outputs one of them. The distance data r1 supplied from the selector 37 is input to a second correction value generation unit 41 in FIG. 6.

The second correction value generation unit 41 generates a correction value r5 in response to the distance data r1. The second correction value generation unit 41 includes a color correction unit 42, an offset calculation unit 43 and correction restriction unit 44. The color correction unit 42 calculates a luminance correction value with respect to each color of the pixel data. The offset calculation unit 43 calculates an offset value necessary for calculating the luminance correction value with respect to each color of the pixel data. The correction restriction unit 44 restricts the luminance correction value with respect to each color of the pixel data so that the luminance correction value is equal to or lower than an upper limit value that is set in advance. Note that, for example, it is possible to form the second correction value generation circuit 41 with known art techniques.

Receiving the distance data r1 from the selector 37 in FIG. 6, the second correction value generation circuit unit 41 in FIG. 6 calculates the correction value r5 in response to the distance data r1 and outputs the correction value r5. The correction value r5 is output to the correction processing unit 45 in FIG. 6. The correction value r3 output from the selector 37 is also output to the correction processing unit 45 in FIG. 6. In other words, either of the correction signals r3 or r5 is input to the correction processing unit 45.

The pixel data PD is input to the correction processing unit 45 in FIG. 6. The correction processing unit 45 performs the shading correction processing on the pixel data PD by using the input correction value and outputs the shading-corrected pixel data PDa.

Aspects of the shading correction circuit include the following advantages:

1. The shading correction value of the pixel data PD is generated based on the direct distance from the center of the frame of the pixel data PD.

2. The selector 37 selects either an operation for generating shading correction value by reading from the correction table 40 in FIG. 6 based on the direct distance or an operation for generating shading correction value by calculating in the second correction value generation circuit 41 in FIG. 6 based on the direct distance.

3. When the selector 37 selects the operation for generating a shading correction value by reading from the correction table 40 in FIG. 6, it is possible to set, in advance, the correction table 40 capable of correcting the unevenness in luminance depending on the occurrence of the luminance unevenness of respective pixels in the piece of frame. Hence, the operation for generating shading correction value by reading from the correction table 40 in FIG. 6 can improve accuracy in the shading correction.

4. When the selector 37 selects the operation for generating shading correction value through calculation using the second correction value generation circuit 41 in FIG. 6, the correction table 40 is not required. Hence, when the luminance unevenness regularly occurs based on the direct distance, the operation for generating shading correction value by calculating in the second correction value generation circuit 41 in FIG. 6 can perform effective shading correction simply without using the correction table 40.

5. The beginning correction distance setting unit 35 in FIG. 6 generates the shading correction value only when the direct distance of the pixel data PD is equal to or higher than a certain value. Thus, when setting the correction table 40 in FIG. 6, the correction value is set to only a certain direct distance equal to or higher than the certain value. As a result, the memory capacity required to set the correction table 40 can be reduced.

6. The correction range compression unit 39 in FIG. 6 can compress the direct distance to compress the correction value that is set in advance in the correction table 40. This allows reduction in memory capacity required to set the correction table 40.

7. Combined use of the correction start distance setting unit 35 and the correction range compression unit 39 in FIG. 6 allows the reduction in memory capacity required to set the correction table 40 in FIG. 6. In addition, since it is possible to bring the compression ratio of the correction range compression unit 39 in FIG. 6 closer to one (1) while the memory capacity is reduced, the degradation in correction accuracy due to compression of correction range is prevented.

8. The weight processing unit 28 in FIG. 6 can adjust the weight for the direct distance in both of the X-axis direction and the Y-axis direction. Hence, the exemplary implementation in accordance with aspects of the present invention can perform the shading correction with weighting, for example, so as to form an oval shape, other than performing the shading correction on the pixel data PD positioned on the concentric circle with the same correction values.

9. The rotation processing unit 22 and the mirror processing unit 27 in FIG. 6 can set the weight having a reference line, which serves as a weighting center, obtained by rotating the X-axis or the Y-axis.

10. Since the rotation processing unit 22 rotates the coordinates in units of forty five (45) degrees, this allows a simple circuit. As described above, the exemplary implementation in accordance with aspects of the present invention can provide the shading correction circuit not only capable of improving its accuracy in the shading correction but also capable of reducing the circuit size.

Aspects of the present invention can achieved by additional implementations in accordance with aspects of the present invention. For example, both the correction value r3 and the distance data r1 supplied to the selector 37 may be input to the second correction value generation circuit 41. This allows the correction value r5 generated by the second correction value generation unit 41 to be added to the correction value r3. Moreover, the shading correction circuit 16 can be applied to an interlace operation in which the pixel data PD is input in alternate rows.

Example implementations in accordance with aspects of the present invention of the present invention have now been described in accordance with the above advantages. It will be appreciated that these examples are merely illustrative of the invention. Many variations and modifications will be apparent to those skilled in the art.

What is claimed is:

1. A correction circuit that corrects an image data in a piece of a frame, the correction circuit comprising:
    a weight processing unit that performs weighting on position data corresponding to a relative position in response to the relative position between a position of a pixel in the image data and a certain position in the frame;
    a selector that selects one of a distance data and a correction value based on an enable signal; and
    a correction processing unit that corrects the image data based on the correction value corresponding to the weighted position data;
    wherein the selector outputs the selected one of the distance data and the correction value to the correction processing unit.

2. The correction circuit according to claim 1, further comprising:
    a beginning correction distance setting unit which determines whether to correct the image data based on a beginning correction position.

3. The correction circuit according to claim 1, further comprising:
    a beginning correction distance setting unit which calculates a second direct distance based on a beginning correction position and a first direct distance between the position data and the certain position in the frame.

4. The correction circuit according to claim 3, further comprising:
    a correction range compression unit which compresses one selected from a group consisting of the first direct distance and the second direct distance.

5. The correction circuit according to claim 1, wherein the correction value is one selected from a group consisting of a first correction value obtained from a correction table that stores the correction value and a second correction value obtained from a correction calculation unit that calculates the correction value.

6. The correction circuit according to claim 5, further comprising:
    a selection unit which select one of the first correction value and the second correction value.

7. The correction circuit according to claim 1, wherein the weight processing unit performs arithmetical operations on a weighting coefficient and at least one selected from a group consisting of an X-axis direction coordinate and a Y-axis direction coordinate of the position data of the pixel corresponding to the relative position, and generates the weighted position data.

8. The correction circuit according to claim 1, further comprising:
a rotation processing unit that rotates the relative position relative to the certain position of the frame and that outputs the rotated relative position.

9. The correction circuit according to claim 1, further comprising:
a mirror processing unit that inverts the relative position around one selected from a group consisting of an X-axis and a Y-axis and outputs the inverted relative position.

10. A method of correcting an image data comprising:
calculating a relative position between a position of a pixel of the image data in a frame and a certain position in the frame;
performing weighting on position data corresponding to the relative position; and
correcting the image data based on a correction value corresponding to the weighted position data;
wherein one of a distance data and the correction value is selected based on an enable signal and is outputted to the correction processing unit.

11. The method of correcting the image data according to claim 10, further comprising:
calculating a direct distance between the position of the pixel and the certain position in the frame; and
determining the image data to be corrected based on the direct distance and a correction start position.

12. The method of correcting the image data according to claim 11 further comprising:
compressing the direct distance and calculating a compressed direct distance; and
correcting the image data based on the compressed direct distance.

13. The method of correcting the image data according to claim 10, wherein the position data belongs to one of four quadrants, the four quadrants being divided by an X-axis coordinate and a Y-axis coordinate the method, further comprising:
determining in which quadrant the position data belongs; and
performing the weighting on the position data based on a weighting coefficient and a result of the determination.

14. The method of correcting the image data according to claim 10, further comprising:
obtaining the correction value from a table which stores the correction value; and
performing shading correction on the image data.

15. The method of correcting the image data according to claim 10, further comprising:
calculating the correction value; and
performing shading correction on the image data.

16. The method of correcting the image data according to claim 10, further comprising:
selecting the correction value by one of obtaining a correction value from the table and calculating the correction value; and
performing the shading correction based on the correction value.

17. An image pickup apparatus comprising:
an input unit that converts an image signal, input from outside the image pickup apparatus, into an analog signal;
an analog front end unit that converts the analog signal into a digital signal;
a digital back end unit that processes the digital signal,
wherein the digital back end unit includes:
a correction circuit which corrects an image data in a frame,
wherein the correction circuit further includes:
a weight processing unit that performs weighting on position data corresponding to a relative position, in response to the relative position between a position of a pixel in the image data and a certain position in the frame, and
a correction processing unit that corrects the image data based on a correction value, wherein the correction value corresponds to the weighted position data;
wherein a selector selects one of a distance data and the correction value based on an enable signal and outputs the selected one of the distance data and the correction value to the correction processing unit.

18. The image pickup apparatus according to claim 17, wherein the correction circuit includes
a beginning correction distance setting unit that determines whether to correct the image data based on a beginning correction position.

19. The image pickup apparatus according to claim 17, further comprising:
a noise correction circuit that corrects noise of the digital signal, and
a compression circuit that compresses a corrected signal output from the correction circuit.

20. The image pickup apparatus according to claim 17, wherein the correction circuit corrects the image data by using at least one selected from a group consisting of a first correction value obtained from a correction table which stores the correction value and a second correction value obtained from a correction calculation unit which calculates the correction value.

* * * * *